United States Patent
Yoshida et al.

(10) Patent No.: US 11,312,195 B2
(45) Date of Patent: Apr. 26, 2022

(54) FRONT SUSPENSION DEVICE FOR VEHICLE

(71) Applicant: MAZDA MOTOR CORPORATION, Hiroshima (JP)

(72) Inventors: Shohei Yoshida, Aki-gun (JP); Takashi Hamada, Aki-gun (JP); Yuuki Uchiba, Aki-gun (JP); Susumu Sano, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 2 days.

(21) Appl. No.: 17/001,193

(22) Filed: Aug. 24, 2020

(65) Prior Publication Data

US 2021/0061037 A1 Mar. 4, 2021

(30) Foreign Application Priority Data

Sep. 2, 2019 (JP) ............................. JP2019-159400

(51) Int. Cl.
*B60G 7/00* (2006.01)
*B62D 21/11* (2006.01)

(52) U.S. Cl.
CPC ............. *B60G 7/001* (2013.01); *B62D 21/11* (2013.01); *B60G 2204/1431* (2013.01); *B60G 2206/016* (2013.01); *B60G 2206/122* (2013.01)

(58) Field of Classification Search
CPC ........... B60G 7/001; B60G 2204/1431; B60G 2206/016; B60G 2206/122; B60G 2300/50; B60G 2200/1424; B60G 2204/15; B60G 3/06; B60G 7/02; B60G 7/008; B62D 21/11; B62D 21/155
See application file for complete search history.

(56) References Cited

U.S. PATENT DOCUMENTS

| 4,570,968 | A | * | 2/1986 | Mukai | ................... B60G 7/001 280/124.145 |
| 5,607,177 | A | | 3/1997 | Kato | |
| 2019/0300059 | A1 | * | 10/2019 | Komiya | ............... B62D 21/155 |
| 2020/0102012 | A1 | * | 4/2020 | Sakai | .................... B60G 7/001 |
| 2020/0307703 | A1 | * | 10/2020 | Kawai | .................. B62D 21/155 |

FOREIGN PATENT DOCUMENTS

| DE | 10338625 | A1 | * | 3/2005 | ............ B60G 3/265 |
| JP | H08-67120 | A | | 3/1996 | |
| JP | 2011178335 | A | * | 9/2011 | |

* cited by examiner

*Primary Examiner* — Darlene P Condra
(74) *Attorney, Agent, or Firm* — Studebaker & Brackett PC

(57) ABSTRACT

A front suspension device for a vehicle that, when a collision load acts on a suspension arm, reduces the detachment amount of a subframe mounting portion on the rear side from a vehicle body, absorbs collision load energy, and reduces an input to a rear axially supporting portion for a subframe. The front suspension device for a vehicle includes a subframe; a suspension arm having an outer end on which a front wheel is pivotally supported, and an inner end pivotally supported with respect to the subframe; a subframe mounting portion for mounting the subframe to a vehicle body through a fastener from below on the rear side relative to a front-wheel axially supporting portion of the suspension arm; and an upward bend inducing portion for bending the suspension arm upward when a suspension arm frontal collision load is input via the front wheel to the suspension arm.

4 Claims, 9 Drawing Sheets

FRONT SUSPENSION DEVICE FOR VEHICLE

TECHNICAL FIELD

This disclosure relates to a front suspension device for a vehicle, and more specifically to a front suspension device for a vehicle, which includes: a suspension arm having an outer end on which a front wheel is pivotally supported and an inner end pivotally supported with respect to a subframe; and a subframe mounting portion for mounting the subframe to a vehicle body through a fastener from below on the rear side relative to a front-wheel axially supporting portion of the suspension arm.

BACKGROUND ART

Conventionally, it has been known that, in a front suspension device, if a lower arm as the suspension arm has a closed cross-section, high supporting rigidity can be realized even for an electric vehicle with a high vehicle weight equipped with a heavy object, for example, a high voltage battery, other than a powertrain unit.

In this case, as disclosed in Japanese Patent Laid-Open No. 8-67120, if a recess extending in the vehicle width direction is formed on the upper surface of the lower arm, when a collision load acts on the lower arm, collision energy can be absorbed by a deformation of the lower arm starting from the recess.

However, in the structure of Japanese Patent Laid-Open No. 8-67120, the lower arm bends downward from the recess as the starting point. Consequently, downward force acts on the vehicle body mounting portion on the rear side, and there is a concern that the vehicle body mounting portion may be detached from the vehicle body. When the vehicle body mounting portion is detached from the vehicle body, the amount of retreat of the subframe is larger, a stabilizer on the subframe interferes with a toe board and causes the toe board to retreat, and thus there is room for improvement in this respect.

SUMMARY

Therefore, this disclosure provides a front suspension device for a vehicle that, when a collision load acts on a suspension arm, can absorb collision load energy without causing detachment of a subframe mounting portion on the rear side from a vehicle body.

A front suspension device for a vehicle of this disclosure includes a subframe; a suspension arm having an outer end on which a front wheel is pivotally supported, and an inner end pivotally supported with respect to the subframe; a subframe mounting portion for mounting the subframe to a vehicle body through a fastener from below on the rear side relative to a front-wheel axially supporting portion of the suspension arm; and an upward bend inducing portion for bending the suspension arm upward when a suspension arm frontal collision load is input via the front wheel to the suspension arm.

According to this configuration, when the frontal collision load acts on the suspension arm via the front wheel, the suspension arm bends upward due to the upward bend induction portion. Consequently, since slip-off resistance occurs at the subframe mounting portion of the suspension arm, collision load energy can be absorbed without causing detachment of the subframe mounting portion from the vehicle body.

In one embodiment of this disclosure, the suspension arm is a lower arm having a front axially supporting portion for the subframe and a rear axially supporting portion located on the rear side relative to the front-wheel axially supporting portion, and the upward bend inducing portion is formed between the front-wheel axially supporting portion and the rear axially supporting portion.

According to the above-described configuration, since the upward bend inducing portion is formed between the front-wheel axially supporting portion and the rear axially supporting portion, this configuration is suitable against a collision in an oblique direction (for example, an oblique collision) in which about 60% of the collision load acts on the lower arm via the front wheel. In other words, it is possible to absorb the load in the oblique collision by the upward bending deformation of the upward bend inducing portion and reduce the detachment amount of the rear axially supporting portion from the vehicle body.

In one embodiment of this disclosure, the upward bend inducing portion is formed in an upward curved portion of the lower arm in a side view of the vehicle. According to the above-described configuration, it is possible to sufficiently secure an offset amount that the centroid of the upward curved portion is offset upward with respect to an input point of the collision load input to the lower arm via the front wheel, and consequently the entire upward bend inducing portion bends, a larger amount of energy is absorbed, and the input to the rear axially supporting portion is reduced.

In one embodiment of this disclosure, the lower arm is composed of an upper member with an open lower side and a lower member with an open upper side, and the rigidity of the lower member is lower than the rigidity of the upper member. According to the above-described configuration, it is possible to secure the stability of upward bending deformation of the lower arm when a frontal collision load is input.

In one embodiment of this disclosure, a recess is provided in a lower wall of the upward curved portion of the lower arm. According to the above-described configuration, since the recess provided in the lower wall functions as the bending starting point of upward bend induction, it is possible to secure the stability of upward bend induction and consequently secure the stability of absorbing collision energy.

In one embodiment of this disclosure, the rear axially supporting portion of the lower arm with respect to the subframe also serves as the subframe mounting portion for the subframe with respect to the vehicle body. According to the above-described configuration, since the rear axially supporting portion also serves as the subframe mounting portion, it is possible to simplify the suspension device.

According to this disclosure, when a collision load acts on the suspension arm, there is an advantageous effect of absorbing collision load energy without causing detachment of the subframe mounting portion on the rear side from the vehicle body.

DETAILED DESCRIPTION

Reducing the detachment amount of a subframe mounting portion on the rear side of a suspension arm from a vehicle body when a collision load acts on the suspension arm and absorbing collision load energy is achieved by a configuration including a subframe; a suspension arm having an outer end on which a front wheel is pivotally supported, and an inner end pivotally supported with respect to the subframe; a subframe mounting portion for mounting the subframe to a vehicle body through a fastener from below on the rear side relative to a front-wheel axially supporting portion of the suspension arm; and an upward bend inducing portion for bending the suspension arm upward when a suspension arm frontal collision load is input via the front wheel to the suspension arm.

Figure 1:
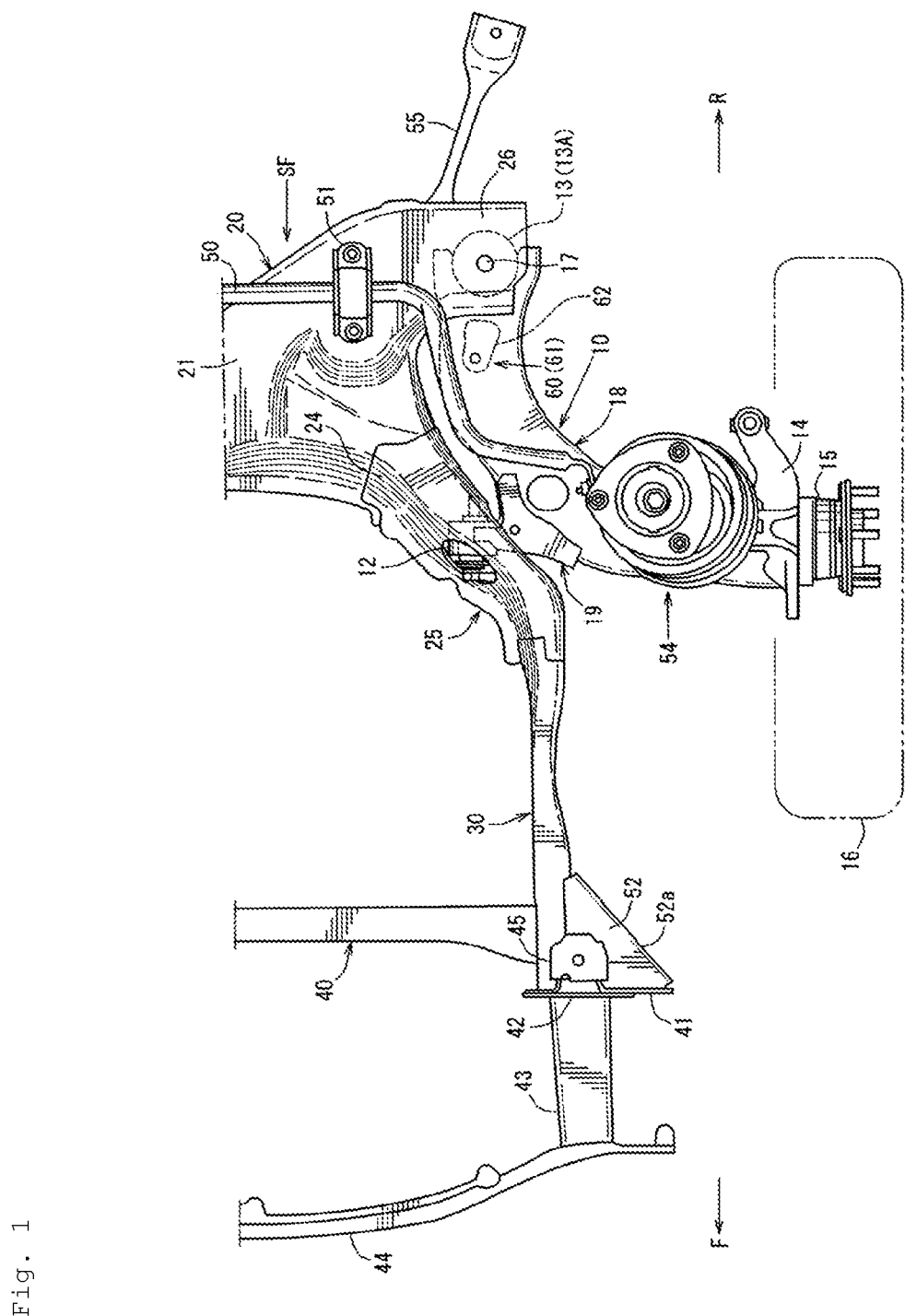
FIG. 1 is a vehicle left-side plan view showing a front suspension device for a vehicle of the present disclosure.
Figure 2:
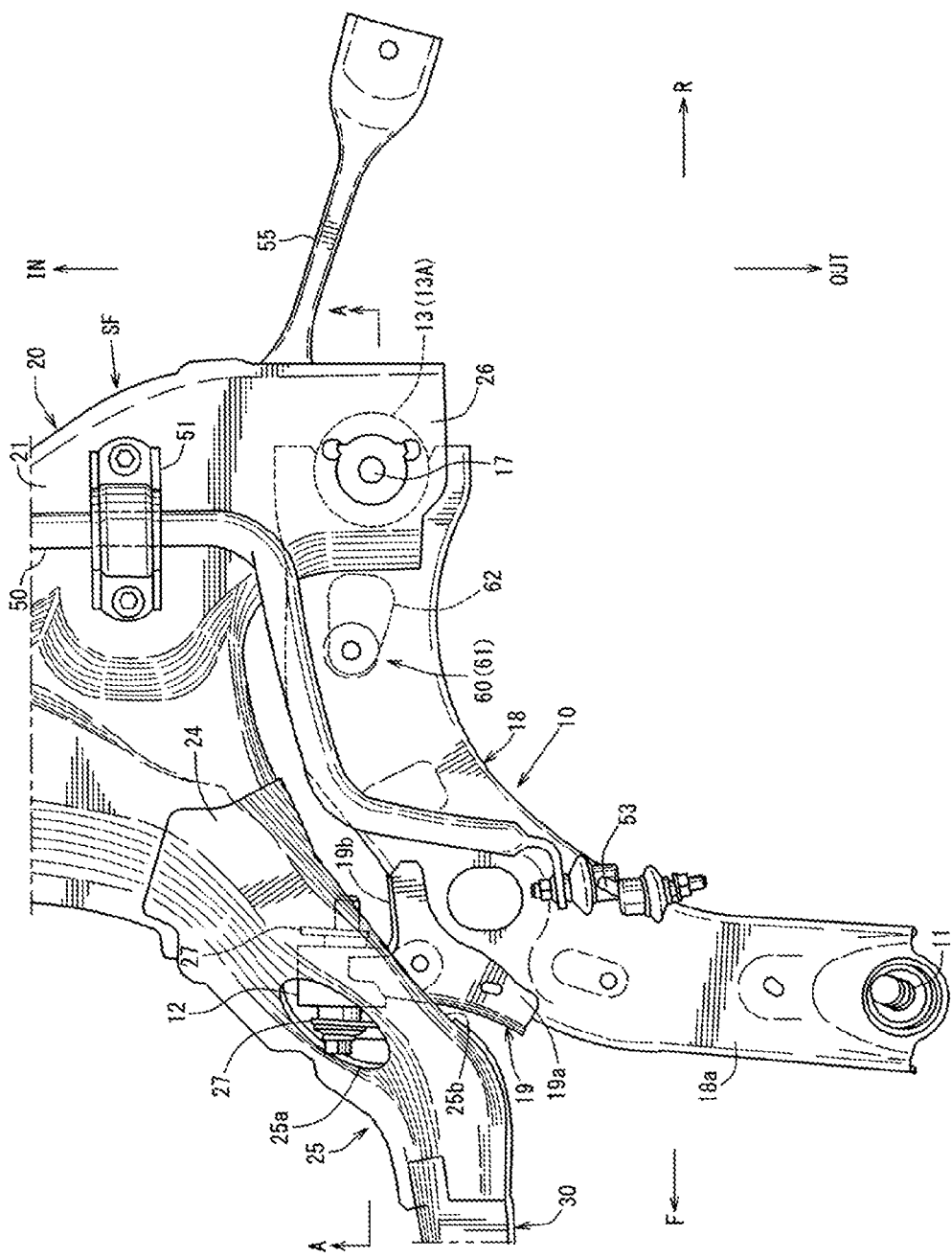
FIG. 2 is an enlarged plan view of essential parts in FIG. 1.
Figure 3:
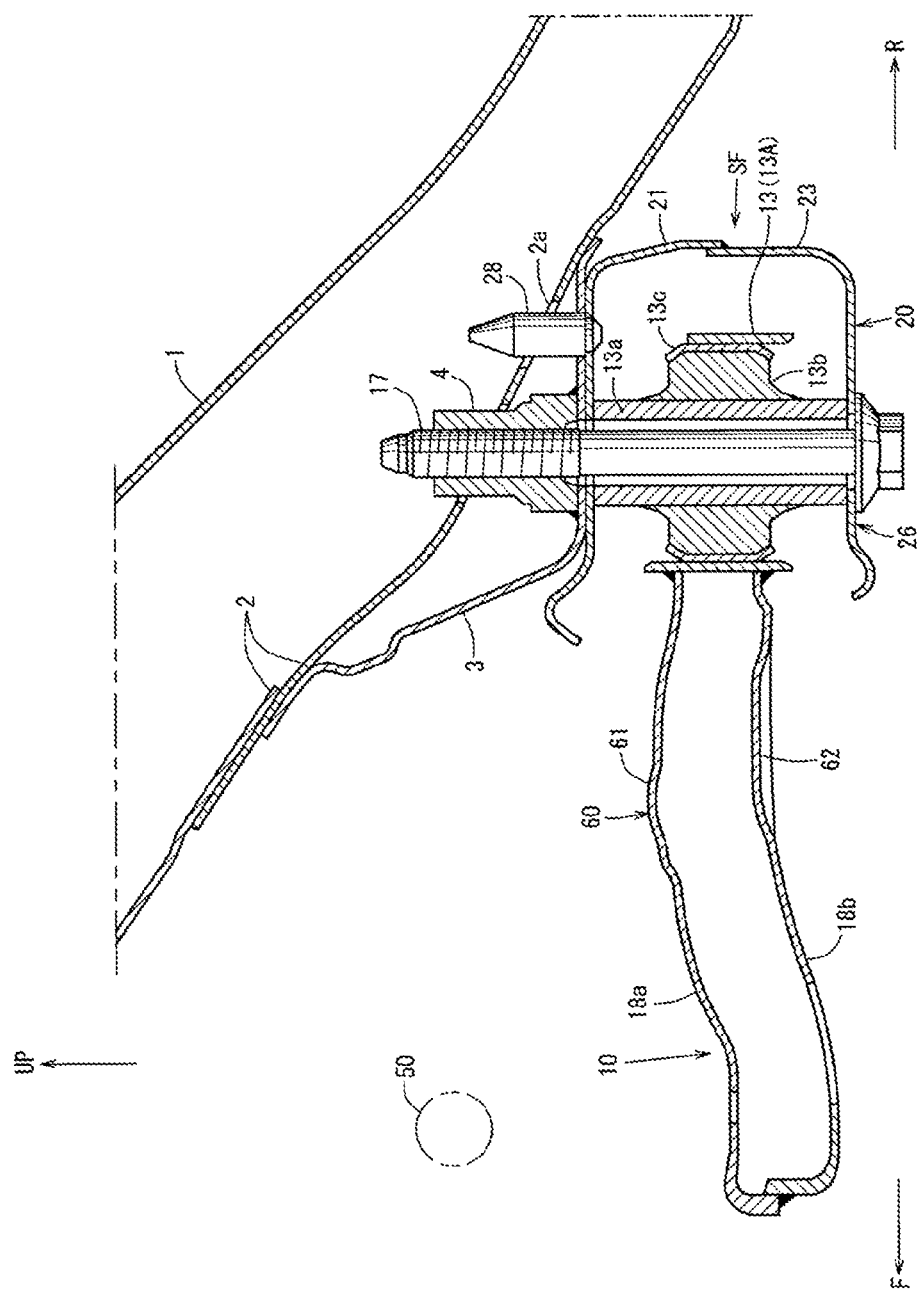
FIG. 3 is a sectional view taken along the A-A line indicated by arrows in FIG. 2.
Figure 4:
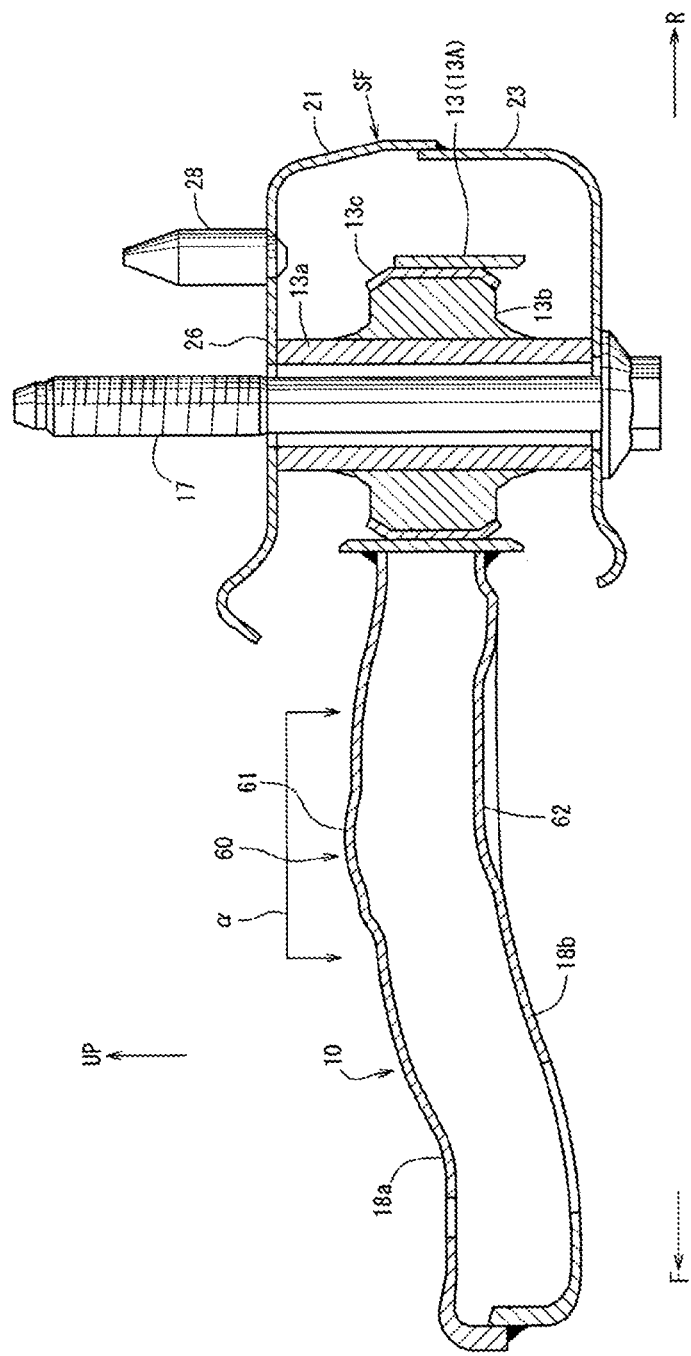
FIG. 4 is an enlarged view of essential parts in FIG. 3.
Figure 5:
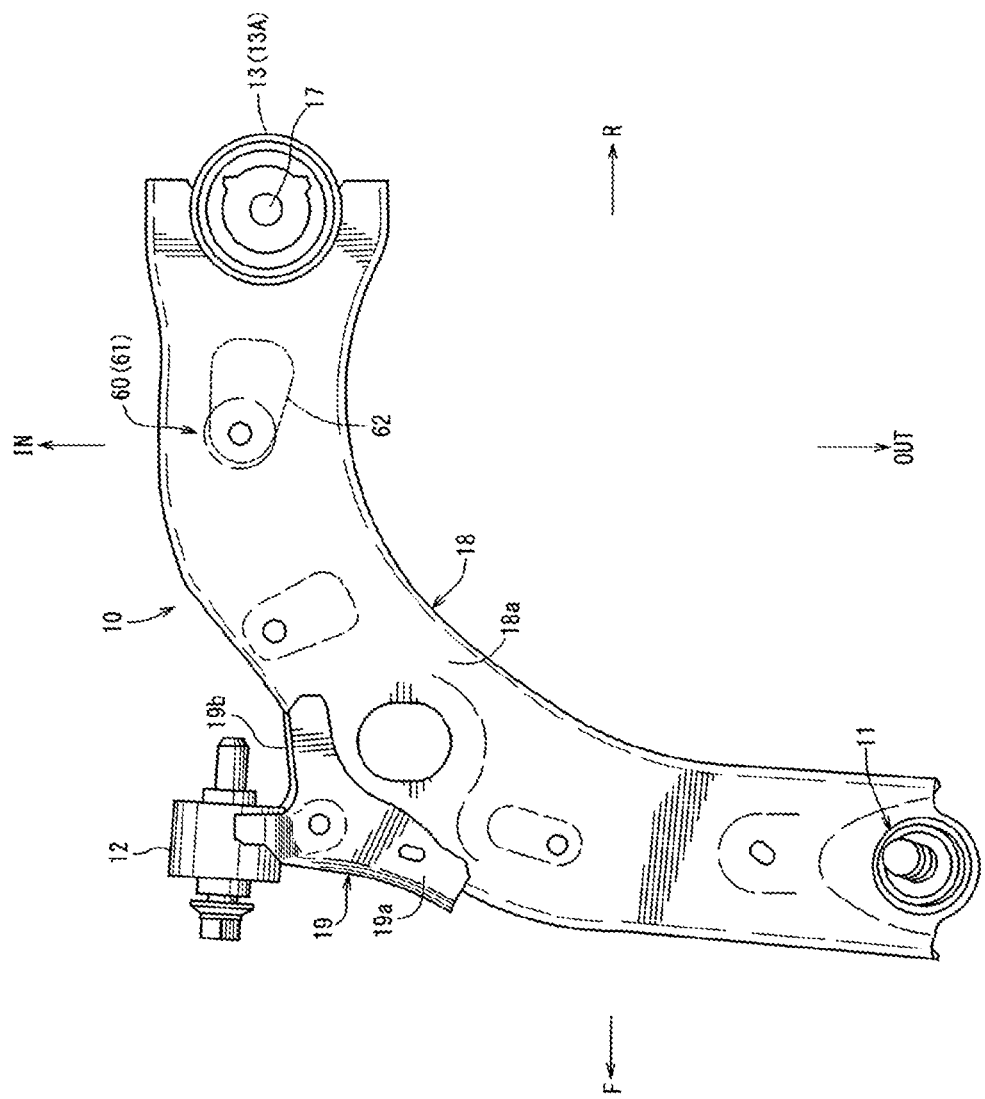
FIG. 5 is a plan view of a lower arm.
Figure 6:
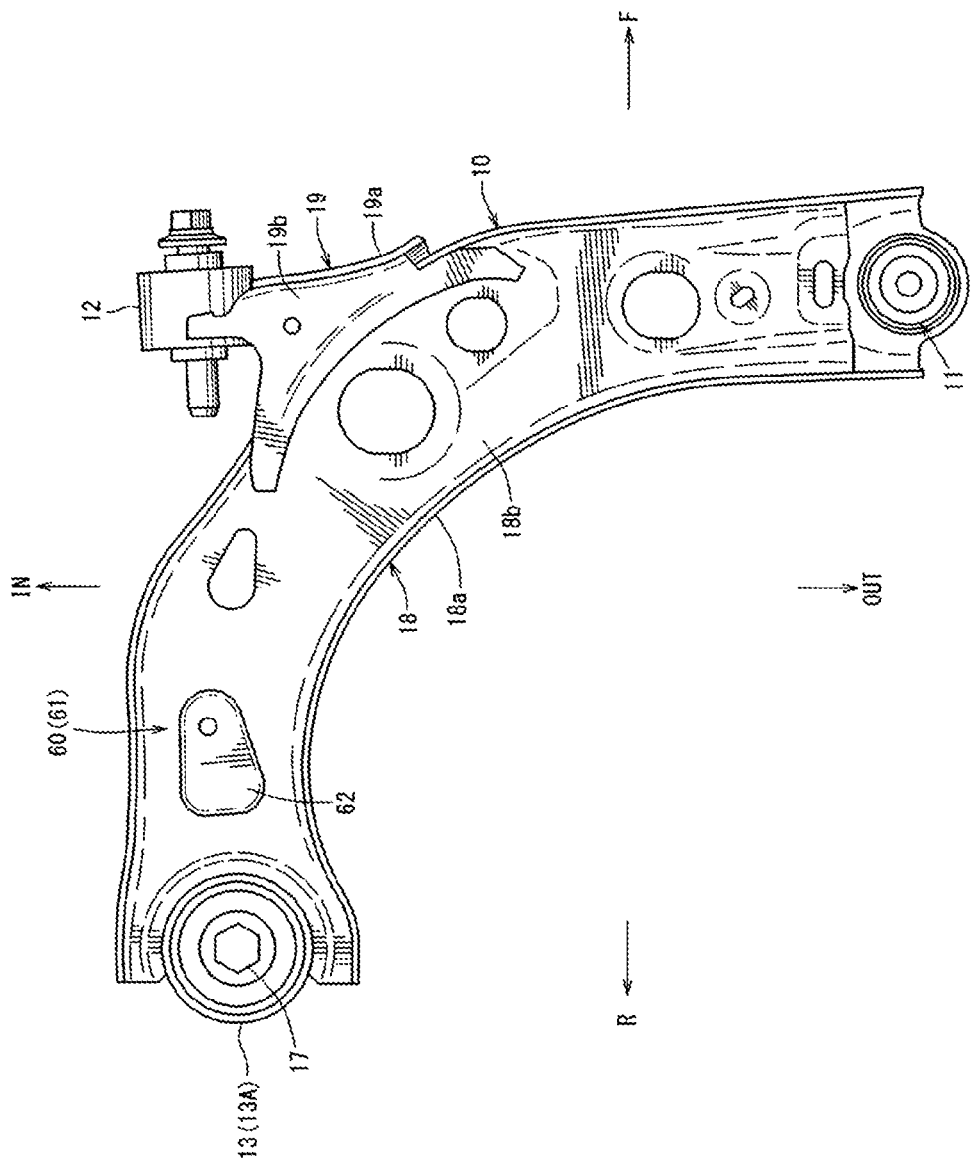
FIG. 6 is a bottom view of the lower arm.
Figure 7:
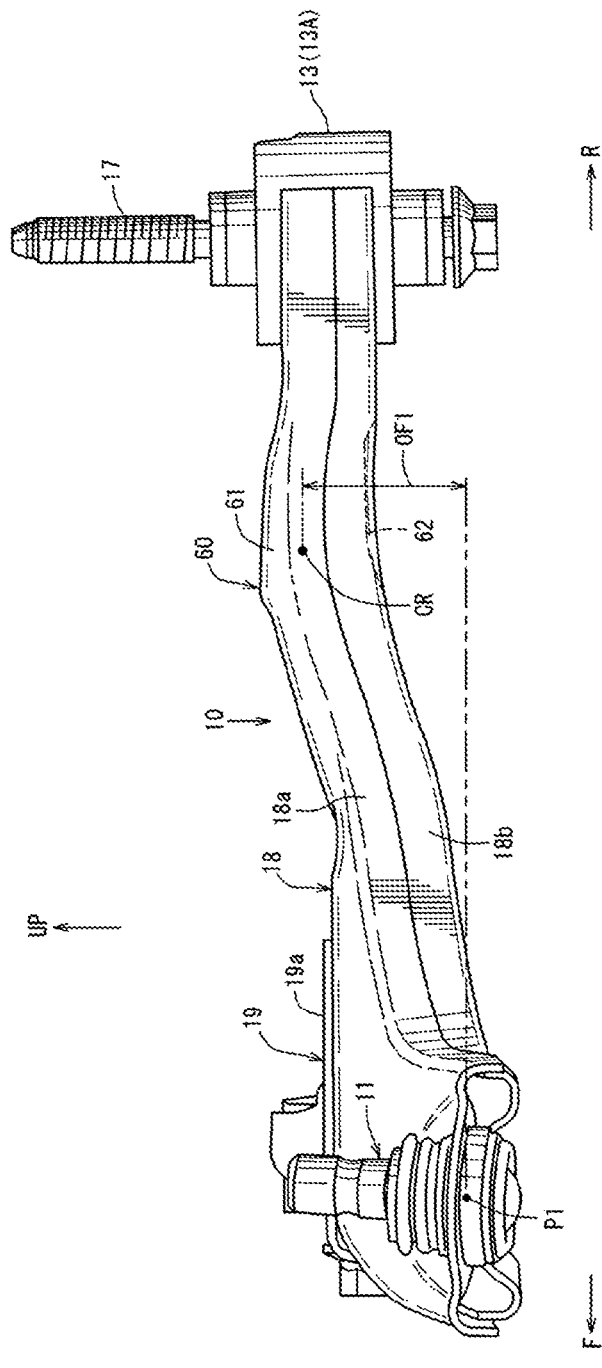
FIG. 7 is a side view of the lower arm.

One example of this disclosure will be described in detail below based on the drawings. The drawings show a front suspension device for a vehicle, wherein FIG. 1 is a vehicle left-side plan view showing the front suspension device for a vehicle of the present disclosure, FIG. 2 is an enlarged plan view of essential parts in FIG. 1, FIG. 3 is a sectional view taken along the A-A line indicated by arrows in FIG. 2, and FIG. 4 is an enlarged view of essential parts in FIG. 3. FIG. 5 is a plan view of a lower arm, FIG. 6 is a bottom view of the lower arm, and FIG. 7 is a side view of the lower arm. Although FIG. 1 shows only the configuration on the vehicle left side of the front suspension device for a vehicle, the configuration on the vehicle right side of the front suspension device for a vehicle is formed so that the right side and the left side are substantially symmetrical.

In FIGS. 1 and 2, in the front suspension device for a vehicle, a subframe SF is mounted under an engine compartment in a front portion of the vehicle (or under a motor compartment of an electric vehicle). The subframe SF includes: a cross member body 20 that supports left and right lower arms 10 as left and right suspension arms; a pair of left and right extension frames 30 extending toward the front of the vehicle from the left- and right-side front portions of the cross member body 20; and a transverse member 40 connecting the front ends of the pair of extension frames 30 in the vehicle width direction.

A sub-crash can 43 is mounted on the front end of each extension frame 30 via a set plate 41 and a mounting plate 42, and a sub-bumper beam 44 extending in the vehicle width direction is mounted on the front ends of the pair of left and right sub-crash cans 43, 43.

A vehicle body mounting part 45 extending in the up-down direction is provided on the front end of the extension frame 30 and immediately behind the set plate 41. The vehicle body mounting part 45 is a member for mounting the extension frame 30 on a front side frame.

As shown in FIG. 2, the lower arm 10 is provided with a knuckle supporting portion 11 as a front-wheel axially supporting portion located on a vehicle-width-direction outer side, a lower arm bush 12 as a front axially supporting portion located at a front portion on a vehicle-width-direction inner side, and a lower arm bush 13 as a rear axially supporting portion located at a rear portion on the vehicle-width-direction inner side.

As shown in FIGS. 1 to 3, the cross member body 20 includes an upper panel 21, a front lower panel, a rear lower panel 23, and extension upper panels 24 extending from both the left and right sides of the upper panel 21 toward the front of the vehicle.

Extension parts 25 extending from the upper panel 21 and the rear lower panel 23 toward the front of the vehicle are formed of both the extension upper panels 24 and the front lower panel, and the rear ends of the pair of left and right extension frames 30 are connected and fixed to the front ends of a pair of left and right extension parts 25.

As shown in FIG. 2, openings 25a, 25b are formed on the inner side and the outer side of the extension part 25 in the vehicle width direction, at a position corresponding to the lower arm bush 12.

As shown in FIGS. 2 and 3, a rear supporting portion 26 for supporting the lower arm bush 13 on the rear side of the lower arm 10 is formed of both the upper panel 21 and the rear lower panel 23 such that the rear supporting portion 26 protrudes toward the vehicle-width-direction outer side from the left and right of the rear portion of the cross member body 20.

As shown in FIG. 2, an arm support bracket 27 for supporting the front lower arm bush 12 of the lower arm 10 is attached to the extension part 25, and the lower arm bush 12 is supported by the arm support bracket 27. Further, as shown in FIGS. 1 and 2, a stabilizer mounting bracket 51 for supporting a stabilizer 50 is fastened and fixed to the upper panel 21 of the cross member body 20.

As shown in FIG. 2, an end of the stabilizer 50 is connected to a damper outer cylinder portion of a suspension damper 54 shown in FIG. 1 via a control link 53. A tower part (not shown) extending upward from the extension upper panel 24 is provided on a base portion of the extension upper panel 24 of the cross member body 20. The tower part is a member for mounting the cross member body 20 on the front side frame.

As shown in FIG. 1, an expansion part 52, which protrudes from the front end of the extension frame 30 toward a vehicle-width-direction outer side, is provided as a countermeasure against a small overlap collision. The expansion part 52 is formed such that, in a plan view of the vehicle, a side surface 52a on the vehicle-width-direction outer side slants to the vehicle-width-direction inner side toward the rear of the vehicle body. Specifically, the expansion part 52 is joined and fixed to the front end of the extension frame 30 and the back surface of the set plate 41 and is formed such that the amount of protrusion of the front end of the expansion part 52 toward the vehicle-width-direction outer side is larger than the amount of protrusion of the rear end toward the vehicle-width-direction outer side, and the side surface 52a is formed as a slant surface. In FIGS. 1 and 2, 55 represents a gusset provided between the cross member body 20 of the subframe SF and the vehicle body behind the cross member body 20.

By the way, as shown in FIGS. 1 and 2, the lower arm 10 is a suspension arm having the knuckle supporting portion 11 at the outer end in the vehicle width direction at which a front wheel 16 is pivotally supported through a knuckle 14 and a hub part 15, and the inner end in the vehicle width direction which is pivotally supported on the subframe SF through the front and rear lower arm bushes 12, 13.

Moreover, as shown in FIG. 3, provided on the vehicle rear side of the lower arm 10 relative to the knuckle supporting portion 11 is a subframe mounting portion 13A for mounting the subframe SF to the vehicle body through a bolt 17 as a fastener from below.

As shown in FIG. 3, provided on the front side of a dash lower panel 1 are front side frames 2 extending in the front-rear direction of the vehicle on both the left and right sides of the engine compartment or the motor compartment. The front side frame 2 is a vehicle body rigid member, and, in FIG. 3, a kick-up portion of the front side frame 2 is shown.

As shown in FIG. 3, a subframe mounting base 3 is joined and fixed to the front lower portion of the kick-up portion of the front side frame 2, and a weld nut 4 is fixed in a standing manner to the upper surface of a horizontal portion of the subframe mounting base 3.

The lower arm bush 13 which is a rear axially supporting portion of the lower arm 10 with respect to the subframe SF also serves as the subframe mounting portion 13A for the subframe SF with respect to the vehicle body.

As shown in FIG. 3, the lower arm bush 13 which also serves as the subframe mounting portion 13A is mounted to the front side frame 2 that is the vehicle body, as well as the rear supporting portion 26 of the subframe SF through the bolt 17 fastened into the weld nut 4 from below.

If the rear axially supporting portion of the lower arm 10 and the subframe mounting portion for the subframe SF with respect to the vehicle body are formed separately, a plurality of bolts as fasteners are required and it is necessary to provide a space between the bolts, resulting in complexities in the structure and the assembly man-hour.

As shown in FIG. 3, a positioning pin 28 is fixed in a standing manner on the upper surface of the rear supporting portion 26 of the upper panel 21 of the cross member body 20 of the subframe SF, and the positioning pin 28 is configured to perform positioning with respect to a positioning hole 2a of the front side frame 2.

Here, as shown in FIGS. 3 and 4, an inner cylinder 13a, a rubber 13b, and an outer cylinder 13c are provided inside the lower arm bush 13.

As shown in FIGS. 5 and 6, the lower arm 10 has the lower arm bush 12 as the front axially supporting portion for the subframe SF, and the lower arm bush 13 as the rear axially supporting portion located on the rear side of the vehicle relative to the knuckle supporting portion 11 as the front-wheel axially supporting portion.

Moreover, as shown in FIGS. 5 and 6, the lower arm 10 has a rear arm portion 18 formed in a curved shape from the rear lower arm bush 13 to the knuckle supporting portion 11, and a front arm portion 19 that connects a curved corner portion of the rear arm portion 18 and the front lower arm bush 12 together.

As shown in FIG. 3, the rear arm portion 18 of the lower arm 10 is composed of an upper member 18a with an open lower side and a lower member 18b with an open upper side, and the rear arm portion 18 has a closed cross section made of both the upper member 18a and the lower member 18b. The rigidity of the lower member 18b is lower than the rigidity of the upper member 18a. Specifically, the upper member 18a is formed of a high-tensile steel plate, and the lower member 18b is formed of a material having low rigidity relative to the high-tensile steel plate.

As shown in FIGS. 5 and 6, a front arm portion 19 of the lower arm 10 is composed of an upper member 19a and a lower member 19b.

Moreover, as shown in FIG. 7, the lower arm 10 is provided with an upward bend inducing portion 60 for bending the lower arm 10 upward when a lower arm frontal collision load as a suspension arm frontal collision load is input via the front wheel 16 (see FIG. 1). Thus, when a frontal collision load acts on the lower arm 10 via the front wheel 16, the lower arm 10 is bent upward by the upward bend inducing portion 60. Consequently, slip-off resistance toward the upper side of the vehicle occurs at the subframe mounting portion 13A of the lower arm 10, the detachment amount of the subframe mounting portion 13A from the vehicle body (see the front side frame 2) is reduced, collision load energy is absorbed by the upward bending deformation of the lower arm 10, and the input to the rear axially supporting portion is reduced. In FIG. 4, the range where the upward bend inducing portion 60 is formed is indicated by an arrow α.

More specifically, the upward bend inducing portion 60 is formed between the knuckle supporting portion 11 and the rear lower arm bush 13, that is, between the rear end of the front arm portion 19 and the front end of the lower arm bush 13 in this example.

It is known that about 60% of the collision load in a collision in an oblique direction (for example, an oblique collision) acts on the lower arm 10 via the front wheel 16, and the remaining about 40% is input to the subframe SF via the extension frame 30.

Therefore, by forming the upward bend inducing portion 60 between the knuckle supporting portion 11 and the rear lower arm bush 13, the configuration is suitable for an oblique collision, so that the load in the oblique collision is absorbed by the upward bending deformation of the upward bend inducing portion 60, and the detachment amount of the lower arm bush 13 from the vehicle body is reduced.

More specifically, as shown in FIG. 7, the upward bend inducing portion 60 is formed by an upward curved portion 61 of the rear arm portion 18 of the lower arm 10 in a side view of the vehicle. Accordingly, an offset amount OF1 that a centroid CR of the upward curved portion 61 is offset upward with respect to an input point P1 of a collision load input to the lower arm 10 via the front wheel 16 is sufficiently secured, and, as a result, the entire upward bend inducing portion 60 is bent to obtain a sufficient energy absorption amount.

Additionally, as shown in FIGS. 3 and 7, a lower wall of the lower member 18b of the upward curved portion 61 of the rear arm portion 18 of the lower arm 10 is provided with a recess 62 that is recessed upward. Thus, the recess 62, particularly a rear edge of the recess 62 functions as an upward bending starting point to secure the stability of upward bend induction and consequently secure the stability of collision energy absorption.

Figure 8:
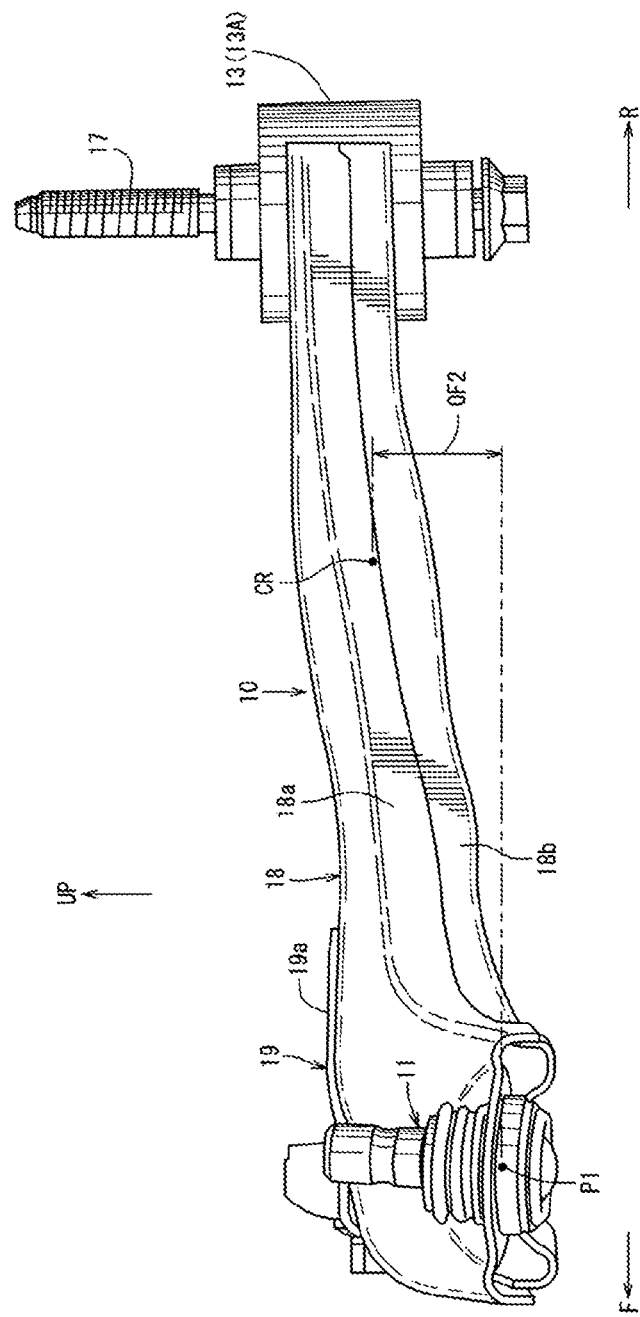
FIG. 8 is a side view of a lower arm of a comparative example.

FIG. 8 is a side view showing a lower arm of a comparative example, and the same parts as those in FIG. 7 are labelled with the same reference signs in FIG. 8 for convenience of explanation. Unlike the present example shown in FIG. 7, the comparative example of FIG. 8 does not have any of the upward bend inducing portion 60, the upward curved portion 61 and the recess 62. Therefore, in the comparative example of FIG. 8, an offset amount OF2 that the centroid CR of the lower arm 10 is offset upward with respect to the input point P1 of a collision load is small.

In short, OF1>OF2. In the comparative example, since the offset amount OF2 is small, when a collision load is input to the lower arm 10 via the front wheel 16, the bending moment acting on the centroid CR is insufficient, and it is difficult to appropriately bend and deform the lower arm 10 upward.

Figure 9:
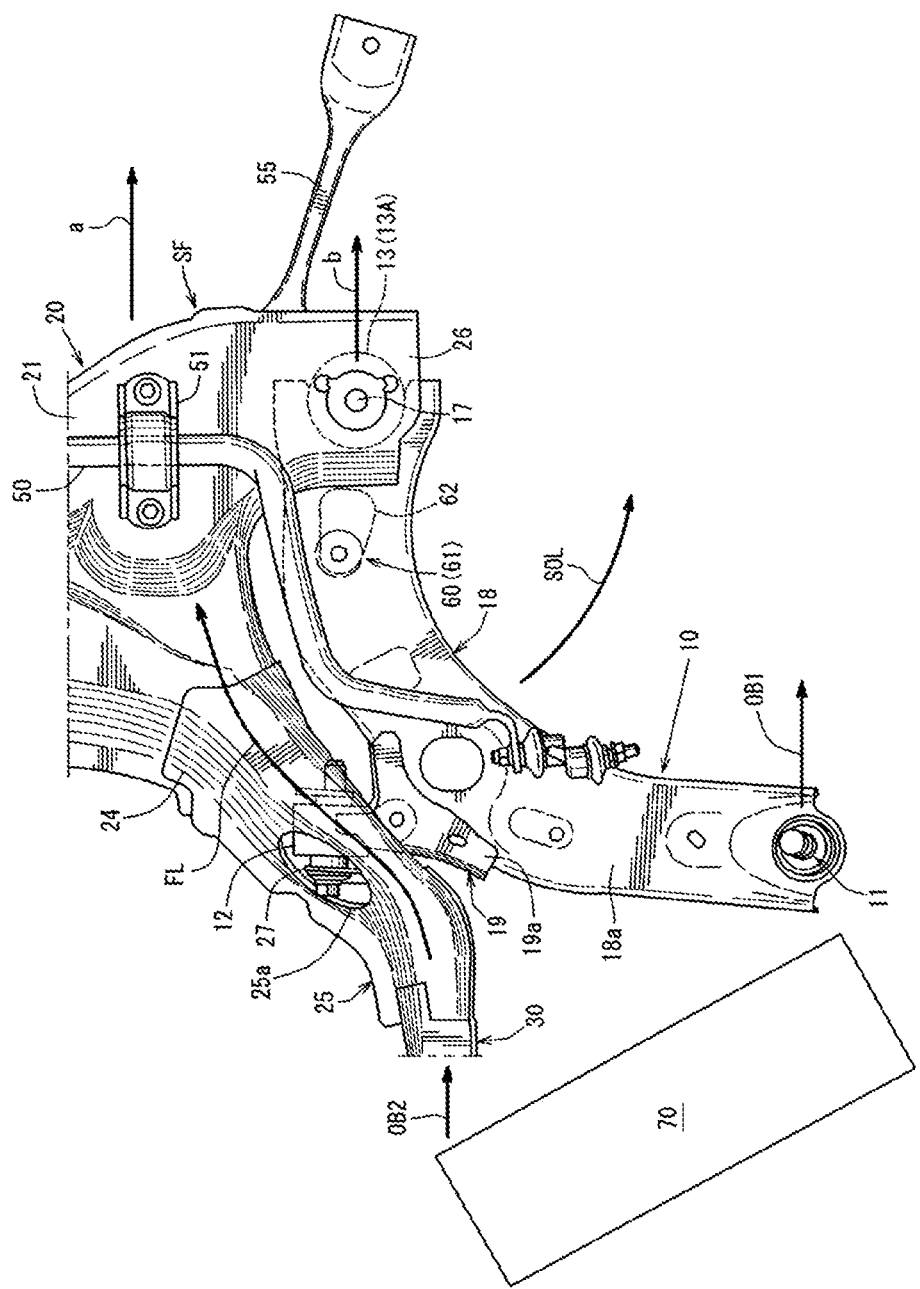
FIG. 9 is a plan view for explaining the function during a vehicle collision.

FIG. 9 is a plan view for explaining the function during a vehicle collision, and, hereinafter the function during a collision will be described with reference to FIG. 9.

Function During Oblique Collision

In an oblique collision in which a colliding object 70 and an own vehicle collide obliquely, about 60% of the collision load acts on the lower arm 10 via the front wheel 16, and the remaining about 40% acts on the subframe SF via the extension frame 30.

When the collision load indicated by an arrow OB1 is input to the knuckle supporting portion 11 of the lower arm 10, the load is transmitted to the rear arm portion 18, the upward curved portion 61 is curved upward with the rear edge of the recess 62 as the bending starting point of upward bend induction, and the entire upward bend inducing portion 60 is bent (deformed to bend outward in an upward direction) to absorb the collision energy and reduce the input to the rear axially supporting portion.

At this time, the rear arm portion 18 of the lower arm 10 has a difference in proof stress between the upper member 18a and the lower member 18b so that the proof stress of the upper member 18a is high and the proof stress of the lower member 18b is low, and the lower member 18b is provided with the recess 62 as the bending starting point. Consequently, the lower member 18b is bent first, and the stress concentrates on the upper member 18a after the lower member 18b is bent.

Moreover, since the upward bend inducing portion 60 is formed as shown in FIG. 7, the offset amount OF1 that the centroid CR is offset upward is large, and consequently it is possible to sufficiently secure a bending moment acting on the centroid CR and appropriately bend and deform the rear arm portion 18 of the lower arm 10 upward.

In an oblique collision, although the collision load input to the cross member body 20 via the extension frame 30 is transmitted to the rear supporting portion 26 of the subframe SF as shown by an arrow OB2 in FIG. 9, the input load is about 40% of the collision load and therefore does not cause detachment of the subframe mounting portion 13A from the vehicle body.

Function During Small Overlap Collision

In a small overlap collision in which the collision load is hardly input to the front side frame 2, about 90% of the collision load acts on the lower arm 10 via the front wheel 16, and the remaining about 10% acts on the subframe SF via the extension frame 30.

When the collision load is input to the knuckle supporting portion 11 of the lower arm 10, this load is transmitted to the rear arm portion 18, and the rear arm portion 18 is bent and deformed rearward and outward of the vehicle with the rear edge of the recess 62 as the bending starting point as shown by an arrow SOL in FIG. 9.

About 10% of the total collision load is transmitted to the rear supporting portion 26 of the subframe SF but does not cause detachment of the subframe mounting portion 13A from the vehicle body. Here, the recess 62 also contributes to the bending of the lower arm 10 rearward and outward in the small overlap collision.

Function During Full-Overlap Collision

In a full-overlap collision, the entire collision load acts on the cross member body 20 via the pair of left and right extension frames 30, 30 as shown by an arrow FL in FIG. 9.

Therefore, backward force shown by arrows a and b in FIG. 9 acts on a stabilizer mounting bracket 51, which is the mounting portion for the stabilizer 50, and on the rear supporting portion 26. When a colliding object enters to some degree, a heavy load acts on the rear supporting portion 26, and the bolt 17 as a fastener comes off and the subframe SF is detached downward from the vehicle body.

Consequently, a power unit supported by the subframe also moves downward, and, in the latter period of the collision, the power unit retreats without significantly interfering with the dash panel, that is, a crash stroke can be secured. Thus, this structure can deal with all of a collision in an oblique direction (oblique collision), a small-overlap collision, and a full-overlap collision.

In the drawings, an arrow F indicates forward of the vehicle, an arrow R indicates rearward of the vehicle, an arrow IN indicates inward in the vehicle width direction, an arrow OUT indicates outward in the vehicle width direction, and an arrow UP indicates upward of the vehicle.

Thus, the front suspension device for a vehicle of the above-described example includes: the subframe SF; the suspension arm (see the lower arm 10) having an outer end on which the front wheel 16 is pivotally supported, and an inner end pivotally supported with respect to the subframe SF; and the subframe mounting portion 13A on the rear side relative to the front-wheel axially supporting portion (see the knuckle supporting portion 11) of the suspension arm (the lower arm 10), for mounting the subframe SF to the vehicle body (front side frame 2) through a fastener (see the bolt 17) from below; and the upward bend inducing portion 60 for bending the suspension arm (the lower arm 10) upward when a suspension arm frontal collision load is input via the front wheel 16 to the suspension arm (the lower arm 10) (see FIGS. 1 to 3).

According to this configuration, when the frontal collision load acts on the suspension arm (the lower arm 10) via the front wheel 16, the suspension arm (the lower arm 10) is bent upward by the upward bend inducing portion 60. Consequently, since slip-off resistance occurs at the subframe mounting portion 13A of the suspension arm (the lower arm 10), it is possible to reduce the detachment amount of the subframe mounting portion 13A from the vehicle body, absorb collision load energy and reduce the input to the rear axially supporting portion.

Moreover, in one embodiment of this disclosure, the suspension arm is the lower arm 10 having the front axially supporting portion (the lower arm bush 12) for the subframe SF and the rear axially supporting portion (the lower arm bush 13) located on the rear side relative to the front-wheel axially supporting portion (the knuckle supporting portion 11), and the upward bend inducing portion 60 is formed between the front-wheel axially supporting portion (the knuckle supporting portion 11) and the rear axially supporting portion (the lower arm bush 13) (see FIG. 2).

According to this configuration, since the upward bend inducing portion 60 is formed between the front-wheel axially supporting portion (the knuckle supporting portion 11) and the rear axially supporting portion (the lower arm bush 13), this configuration is suitable against a collision in an oblique direction (for example, an oblique collision) in which about 60% of the collision load acts on the lower arm 10 via the front wheel 16. In other words, the load in the oblique collision can be absorbed by the upward bending deformation of the upward bend inducing portion 60, and the detachment amount of the rear axially supporting portion (the lower arm bush 13) from the vehicle body can be reduced.

Further, in one embodiment of this disclosure, the upward bend inducing portion 60 is formed in the upward curved portion 61 of the lower arm 10 in a side view of the vehicle (see FIGS. 3, 4 and 7).

According to this configuration, it is possible to sufficiently secure the offset amount OF1 that the centroid CR of the upward curved portion 61 is offset upward with respect to the input point P1 of the collision load input to the lower arm 10 via the front wheel 16, and consequently the entire upward bend inducing portion 60 is bent, a larger amount of energy is absorbed, and the input to the rear axially supporting portion is reduced.

In one embodiment of this disclosure, the lower arm 10 is composed of the upper member 18a with an open lower side and the lower member 18b with an open upper side, and the rigidity of the lower member 18b is lower than the rigidity of the upper member 18a (see FIGS. 3 and 4).

According to this configuration, it is possible to secure the stability of upward bending deformation of the lower arm 10 when a frontal collision load is input.

Furthermore, in one embodiment of this disclosure, the recess 62 is provided in the lower wall of the upward curved portion 61 of the lower arm 10 (see FIGS. 3 and 4).

According to this configuration, since the recess 62 provided in the lower wall functions as the bending starting point of upward bend induction, it is possible to secure the stability of upward bend induction and consequently secure the stability of absorbing collision energy.

Additionally, in one embodiment of this disclosure, the rear axially supporting portion (the lower arm bush 13) of the lower arm 10 for the subframe SF also serves as the subframe mounting portion 13A for the subframe SF with respect to the vehicle body (the front side frame 2) (see FIG. 4).

According to this configuration, since the rear axially supporting portion (the lower arm bush 13) also serves as the subframe mounting portion 13A, it is possible to simplify the suspension device.

For the correspondence between the configuration of this disclosure and the above-described example, the suspension arm of this disclosure corresponds to the lower arm 10 of the example, and similarly, the front-wheel axially supporting portion corresponds to the knuckle supporting portion 11, the vehicle body corresponds to the front side frame 2, the fastener corresponds to the bolt 17, the front axially supporting portion corresponds to the lower arm bush 12, and the rear axially supporting portion corresponds to the lower arm bush 13. However, this disclosure is not limited to the configuration of the above-described example.

As described above, the present disclosure is useful for a front suspension device for a vehicle, including: a subframe; a suspension arm having an outer end on which a front wheel is pivotally supported, and an inner end pivotally supported with respect to the subframe; and a subframe mounting portion for mounting the subframe to the vehicle body through a fastener from below on the rear side relative to a front-wheel axially supporting portion of the suspension arm.

What is claimed is:

1. A front suspension device for a vehicle, comprising:
a subframe;
a suspension arm having an outer end on which a front wheel is pivotally supported, and an inner end pivotally supported with respect to the subframe;
a subframe mounting portion configured to mount the subframe to a vehicle body through a fastener from below on a rear side relative to a front-wheel axially supporting portion of the suspension arm; and
an upward bend inducing portion configured to bend the suspension arm upward when a suspension arm frontal collision load is input via the front wheel to the suspension arm,
wherein
the suspension arm is a lower arm comprising a front axially supporting portion for the subframe and a rear axially supporting portion located on a rear side relative to the front-wheel axially supporting portion,
the upward bend inducing portion is formed between the front-wheel axially supporting portion and the rear axially supporting portion,
the upward bend inducing portion is formed in an upward curved portion of the lower arm in a side view of the vehicle,
the lower arm is composed of an upper member with an open lower side and a lower member with an open upper side, and
a rigidity of the lower member is lower than a rigidity of the upper member.

2. The front suspension device for a vehicle according to claim 1, wherein
a recess is provided in a lower wall of the upward curved portion of the lower arm.

3. The front suspension device for a vehicle according to claim 2, wherein
the rear axially supporting portion of the lower arm with respect to the subframe is further configured as the subframe mounting portion for the subframe with respect to the vehicle body.

4. The front suspension device for a vehicle according to claim 1, wherein
the rear axially supporting portion of the lower arm with respect to the subframe is further configured as the subframe mounting portion for the subframe with respect to the vehicle body.

* * * * *